United States Patent [19]

Manneschi

[11] Patent Number: 5,498,959
[45] Date of Patent: Mar. 12, 1996

[54] METAL DETECTOR WITH MULTIPOLAR WINDINGS SHAPED SO AS TO ELIMINATE THE NEUTRALIZING EFFECTS WHEN SEVERAL METAL MASSES ARE PASSING THROUGH SIMULTANEOUSLY

[75] Inventor: Alessandro Manneschi, Arezzo, Italy

[73] Assignee: C.E.I.A. - Costruzioni Elettroniche Industriali Automatismi - S.p.A., Civitella in Val di Chiana, Italy

[21] Appl. No.: 49,703

[22] Filed: Apr. 20, 1993

[30] Foreign Application Priority Data

Nov. 11, 1992 [IT] Italy .................... AR92A0026

[51] Int. Cl.⁶ .............. G01R 33/12; G08B 13/24
[52] U.S. Cl. ............... 324/243; 324/232; 340/551
[58] Field of Search .................... 324/226, 232, 324/239, 243, 260, 242, 225; 340/540, 551, 552, 572, 541

[56] References Cited

U.S. PATENT DOCUMENTS

| | | | |
|---|---|---|---|
| 3,758,849 | 9/1973 | Susman et al. .................. | 324/243 |
| 4,063,230 | 12/1977 | Purinton et al. .................. | 324/232 |
| 4,135,183 | 1/1979 | Heltemes .................. | 340/572 |
| 4,605,898 | 8/1986 | Aittoniemi et al. .................. | 340/551 |
| 4,866,424 | 9/1989 | Parks .................. | 324/243 |

FOREIGN PATENT DOCUMENTS

| | | |
|---|---|---|
| 813502 | of 0000 | Finland . |
| AR91A0015 | 6/1991 | Italy . |

OTHER PUBLICATIONS

Anderson, III, Phillip Morron, Coplannar antenna for proximate surveillance system, European Patent app. Aug. 1986.

*Primary Examiner*—Sandra L. O'Shea
*Assistant Examiner*—Jay M. Patidar
*Attorney, Agent, or Firm*—Young & Thompson

[57] ABSTRACT

A Metal Detector with windings placed so as to originate multipolar electromagnetic fields, including two or more pairs of transmitter Tx and Receiver Rx windings, in which the different pairs are characterized by having a different number of poles so that the simultaneous passage of two or more metal masses on parallel trajectories will never cause equal and opposite inducted signals in the Rx windings, with a zero resultant so that such masses are detected in any case.

8 Claims, 2 Drawing Sheets

5,498,959

METAL DETECTOR WITH MULTIPOLAR WINDINGS SHAPED SO AS TO ELIMINATE THE NEUTRALIZING EFFECTS WHEN SEVERAL METAL MASSES ARE PASSING THROUGH SIMULTANEOUSLY

BACKGROUND OF THE INVENTION

1. Field of the Invention

The invention concerns a Metal Detector with multipolar windings, to be placed at the entrance of premises needing protection from the admission of armed persons and for other uses connected with the interception of metal objects.

2. Description of the Related Art

The current state of the art in the field of passageway Metal Detectors has emerged from the successive adoption of technology that has made it possible to progressively improve them in terms of both their uniformity of detection, as well as their compatibility with their immediate environment which could be the cause of electromagnetic disturbance or interference.

Such development has meant that makers have concentrated more and more on multipolar transducers and windings that offer the best compatibility with metal structures and surrounding sources of electric interference.

Moreover, Metal Detector apparatus has been developed that is equipped with one or more transmitters and/or one or more field receivers, wherein the transmitter-receiver pairs are made to work simultaneously by some manufacturers, and at different time intervals by others.

One known solution, referred to in the Finnish Patent Application no. 81 3502 and the U.S. Pat. No. 3,758,849, requires the use of two pairs of transmitter and receiver coils, each one consisting of two superimposed windings, equal and crossed. In the solution as constructed in the Finnish patent application no. 81 3502, single metal bodies in transit, especially long, thin structures, positioned in the direction of one of the two pairs of windings, are automatically perpendicular to the other, and therefore always give a substantial signal on at least one of the receiver windings.

This solution for reasons of symmetry, is not ideal for improving the conditions for detecting bodies like those mentioned above, that are passing through the areas of minimum field inside the supervised passageway. This drawback is overcome with the invention that is the subject of Italian Patent Application no. AR 91 A 000015 in the name of Alessandro Manneschi which, due to the symmetrical staggering in height of the transmitter and receiver windings, it is possible to compensate for the minimum signals of the magnetic field of one winding with the largest signal of the other and, in particular, compensate for the minimum field effect on the ground and at the top of the supervised passageway.

However, existing solutions making use of multipolar windings, including those shown above, have one serious drawback that derive from the fact that the simultaneous transit of two or more metal bodies, under certain conditions, can give a reception signal that is far inferior to that generated by the passage of a single one without triggering the alarm. This occurs, for example, whenever two metal bodies pass through simultaneously both maintaining the same position and distance so that,—depending on the structure of the windings,—each produces a variation in incoming signals that is opposite to the other.

Given that in multipolar windings, if they are in a series of alternating opposite poles, the resulting E.M.F. variation in the whole winding terminal, following the simultaneous passage of two bodies that correspond to opposite poles, is minimized, or even nullified.

The same phenomenum occurs again when more than one metal body is in simultaneous transit with a reciprocal position so that each body produces a variation in signal, the algebraic sum of which is small.

Therefore, an adjustment of sensitivity, programmed to reveal a single body, is not sufficient, as in the case shown, to intercept the simultaneous passage of two or more bodies.

Even more serious is the fact that, with known metal detector sensory systems, once the reciprocal position needed to give the above described effect has been found out, by keeping this distance between the bodies and moving them as they advance on a vertical plane through the passageway, the resulting effect of minimization is substantially maintained.

It is clear, therefore, that there is an innumerable series of transit routes, moving on a vertical plane which cause the resulting signal provoked by the group of bodies to be diminished, and for this reason, once these routes which give the minimum signal on the windings have been discovered along with the distance at which these bodies should be kept apart, their transit through the corridor controlled by the Metal Detector is guaranteed not to be registered. Consequently existing metal detectors with one or two pairs of basically equal windings crossed over each other, are able to detect the passage of a single metal body whose mass exceeds a calibrated value, but become vulnerable when two metal bodies with equal features pass through simultaneously at a distance that provokes a minimum signal, hereafter called "pitch".

SUMMARY OF THE INVENTION

The aim of the present invention is the discovery of a geometrical configuration and a positioning of the windings pairs that renders them able to detect both the passage of a single metal body and the passage of more than one metal body however they are positioned, so that the neutralizing effects that arise in known metal detectors with multipolar windings are eliminated.

The technical solution, that has overcome the serious drawback described above in existing detectors consists of the use of two or more pairs of multipolar Tx-Rx windings, that may be crossed over each other, which are characterised by a different number of poles so that the different Tx-Rx pairs have different "d" pitches where there is a minimum signal so that metal bodies in transit, if positioned at a minimum signal distance for one Tx-Rx pair, are not at a minimum signal distance for the other pair or pairs, so that, in this way, they will detect the passage of metal bodies.

A technical solution made in this way makes it possibile to detect the simultaneous passage of one or more bodies and thus eliminates the defects of existing Metal Detector with multipolar windings.

BRIEF DESCRIPTION OF THE DRAWINGS

The invention is described in detail in the following with reference to a preferred embodiment with two pairs of crossed windings, exemplified in the drawings on the attached table in which.

DESCRIPTION OF THE PREFERRED EMBODIMENTS

In the illustrative drawings, the number 1 represents the first multipolar winding; 2, the second multipolar winding, which is basically the same as the first, but crossed over it; A is the first path taken by a disturbing body C; B is the second path taken by a disturbing body C, which is identical to the first; $E_A$ is the signal produced by the passage of the first body along path A in FIG. 1; $E_B$ is the signal produced by the passage of the second body along path B in FIG. 1; $E_{AB}$ is the resulting signal, algebraic sum of signals $E_A$ and $E_B$; 5 represents the five-pole multipolar winding illustrated in FIG. 5.

Figure 3:
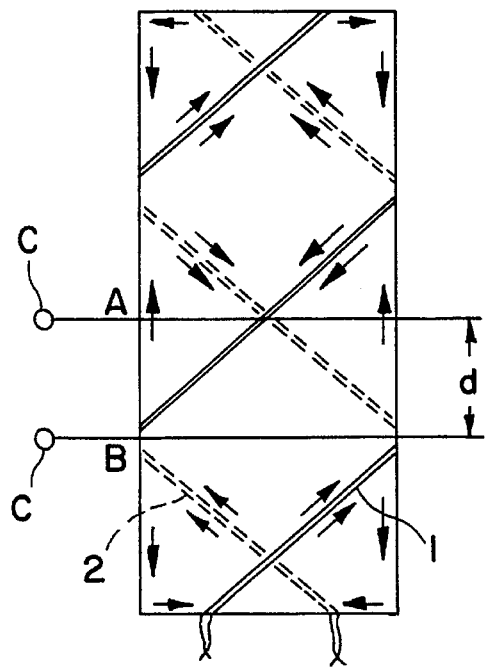
FIG. 3 exemplifies two overlapping flat windings crossed over each other, with an equal number of poles of the type known today, reproduced one, with a solid line, and the other with dotted a line, showing the two paths A and B.
Figure 4:
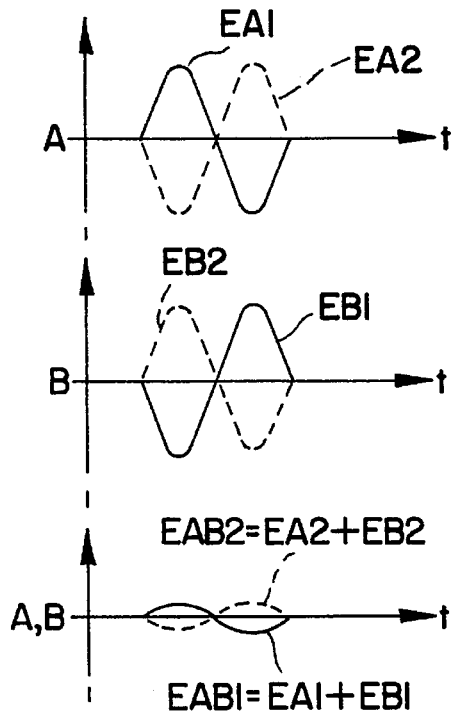
FIG. 4 reproduces respectively, in three Cartesian diagrams, the signal induced on the two windings by the body describing path A (shown with a solid line), the signal induced on the two windings by the body describing the path B (shown with a dotted line), plus the resulting signal induced on the windings by the simultaneous transit of the two bodies.

In the diagrams in FIG. 4, $E_{A1}$, and $E_{A2}$ again represent respectively the signals induced by the body describing path A on the two windings 1 and 2 in FIG. 3; $E_{B1}$ and $E_{B2}$ are the signals induced by the body describing path B on the two windings 1 and 2; $E_{AB1}$ and $E_{AB2}$ are the resulting signals induced on the windings 1 and 2 by the bodies simultaneously describing paths A and B.

Figure 1:
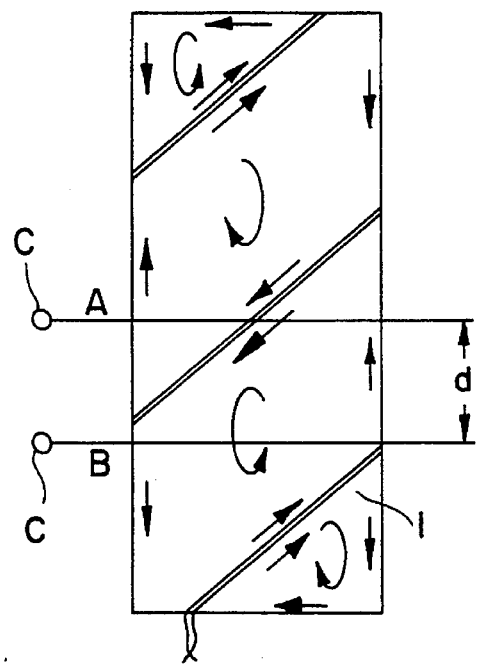
FIG. 1 exemplifies a single flat multipolar winding as well as two paths A and B passed along by two equal metal bodies C, for reference.

In order to illustrate graphically the above, let us consider, for example, in FIG. 1, a body C, which, to be simple we presume to be spherical in shape, in transit in the passageway controlled by a Metal Detector with a single transmitter and a single receiver, along a path A. In this case the signal induced on the winding 1, deriving from the transit of the body C along path A is shown, in FIG. 2, as signal $E_A$. The same body C, made to pass along path B, induces a variation in E.M.F. in the receiver winding, shown, again in FIG. 2, as signal $E_B$. As highlighted in FIGS. 1 and 2, the particular paths chosen give rise to variations in induced signals that are virtually equal in strength and of opposite polarity.

Figure 2:
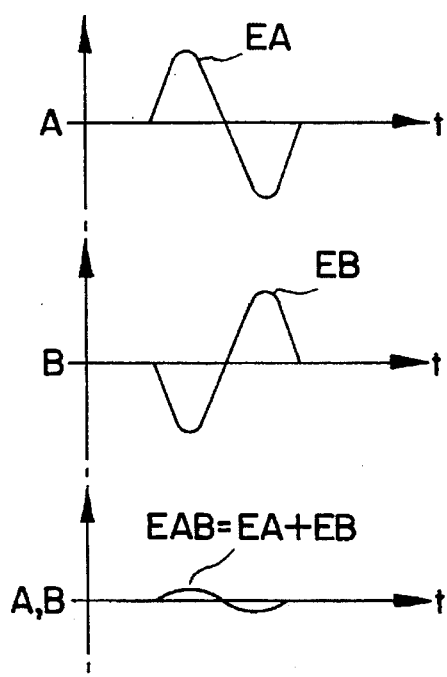
FIG. 2 reproduces respectively in three Cartesian diagrams two signals induced by two equal masses C in transit in the winding in FIG. 1 along paths A and B, plus the resulting signal from these when two bodies pass through simultaneously.

The simultaneous transit of the two spheres C, both positioned on the same vertical and describing the two paths A and B, gives, therefore, the EAB variation shown, in FIG. 2 as the algebraic sum of the $E_A$ and $E_B$ variations which signal has virtually no strength.

The phenomenom of attenuation recurs when the two metal bodies C are made to transit, again simultaneously, any pair of paths, as long as the distance or "d" pitch measured vertically between paths A ad B remains constant.

FIG. 3 exemplifies the two paths AB at a distance "d" in a passageway guarded by a Metal Detector with two pairs of crossed transmitter and receiver windings, both being of the kind reproduced in FIG. 1.

The signal variations produced by the passage of the above mentioned bodies C remain unaltered in the sense that signals $E_{A1}$ and $E_{B1}$ are induced on winding 1, whereas signals $E_{A2}$ and $E_{B2}$ are induced on windings 2 which are equal to and crossed with the first, the signals being equal and the inverse of each other with the result that the $E_{AB1}$ and $E_{AB2}$ signals are nil or minimal.

Identical results can be found with metal bodies of a different shape than spherical, passing along the same paths or at a distance which is an uneven multiple of the "d" pitch measured between the paths A and B, exemplified in FIGS. 1 and 3, providing that both objects remain inside the area covered by the Metal Detector windings.

The invention which makes it possible to eliminate the neutralizing effects here described consists of the avoidance of the basically symmetrical pattern between the pairs of receiver-transmitter windings in the metal detector guarding the passageway and is realized by overlapping and/or placing adjacently two or more transmitter/receiver windings, where at least one receiver-transmitter pair has a different number of poles than the other pairs or, having the same number of poles, the windings must be distributed differently according to geometric size and/or intensity of field. Or, in a further solution, the Metal Detector could have at least one transmitter or receiver shaped in such a way that the "d" pitch where the signal is at a minimum for that winding is a different size from the others.

In this way the minimizing effect on the signal, described above, can still occur on one pair of receiver-transmitter windings but not on the other or others, due to the fact that these have a different number of poles, or are realized differently, requiring a minimum signal transit distance that is different from the preceding one.

What is more, each pair of receiver-transmitter windings has a different number of poles from the other pairs so that the minimum signal "d" pitches have a clearly different size from each other so that any two paths taken by the bodies do not give minimum signals on all the TX-Rx pairs and that the detection is guaranteed. Finally the multipolar winding pairs are designed in such a way that there are no paths which, on the simultaneous passage of more than one metal body, render the resulting induced signal on each receiver smaller than a calibrated value.

Figure 5:
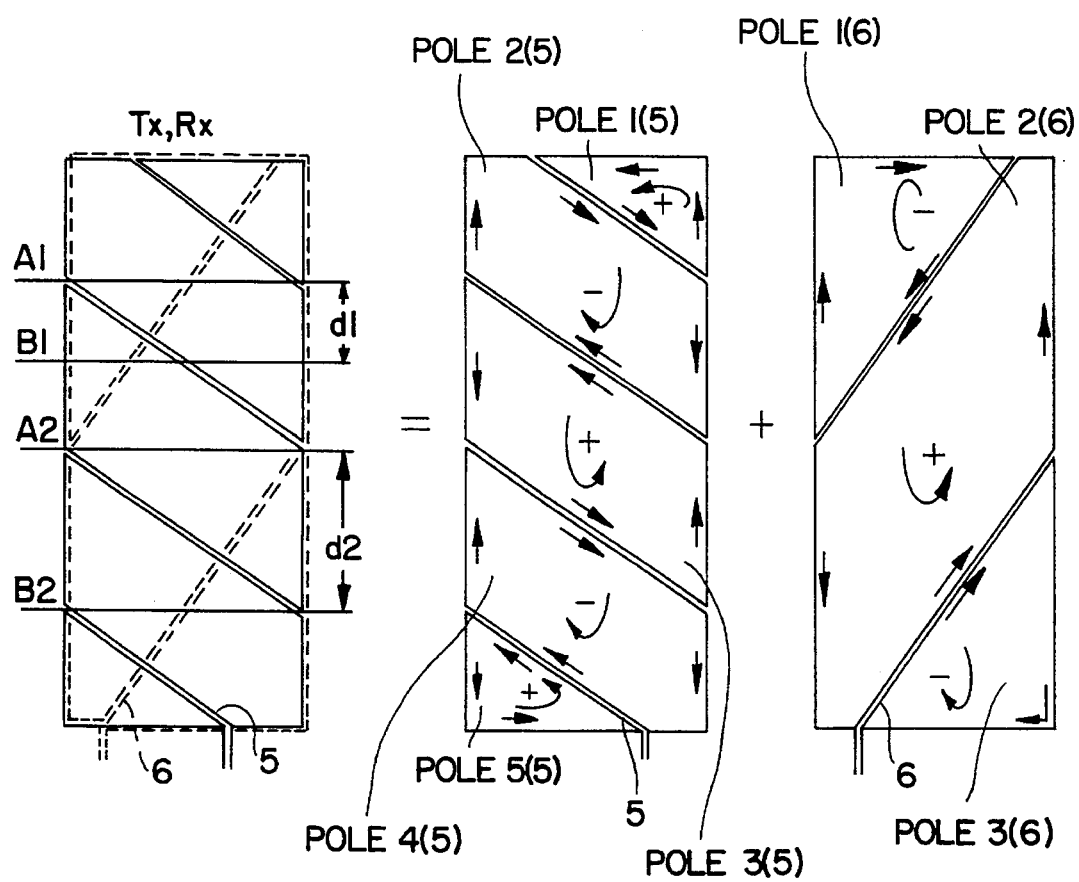
FIG. 5 exemplifies two, overlapping flat windings crossed over each other with a different number of poles, plus paths $A_1$, $B_1$ and $A_2$, $B_2$ at distances or pitches "$d_1$" and "$d_2$", in which a pair of objects for reference describing the first two paths induces a resulting minimum signal on the first winding but not on the second, and vice-versa.
Figure 6:
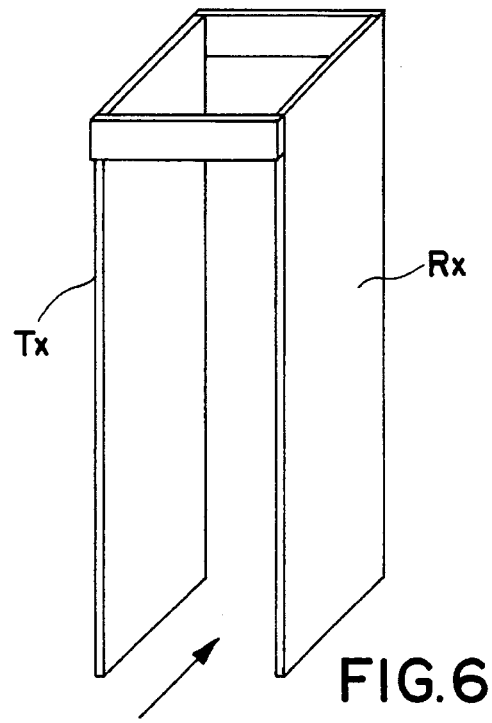
FIG. 6 is a diagram showing the physical relationship of the transmitter Tx relative to the receiver Rx, with the transit path of metal objects through the metal detector represented by the arrow.

One embodiment of the discovery is exemplified in FIG. 5 which shows one of the two metal detector panels with two receiver/transmitter windings 5 and 6 having five and three poles with minimum signal distances or pitches "$d_1$" and "$d_2$". The minimum signal pitch, for the transit of metal bodies along equidistant paths, is "$d_1$" for the five-pole winding and "$d_2$" for the three-pole winding.

Therefore, there does not exist a pair of paths that simultaneously renders the signal variation negligible on both receiver windings. To this end, the number of poles N1, and N2 chosen should correspond to the total height of the windings and, therefore, to the supervised passage.

In particular, in the case of two pairs of receiver/transmitter windings, it must be established that pairs of AB paths with distance "d" do not exist, which would, when passed along simultaneously by metal bodies, determine minimum variations in induced signals on the two pairs of windings, this condition being expressed by:

$$d = d_1 \times k_1 \quad (d_1 \times k_1) \neq (d_2 \times k_2) \text{ where:}$$

$d_1$=minimum signal pitch of winding 5;
$d_2$=minimum signal pitch of winding 6;
$k_1$ and $k_2$=whole, odd numbers.

When k1 and k2 are equal to whole, even numbers, additive, not minimal effects are obtained. All of this applies to any plurality of multipolar windings, be they distributed on a plane, wound round a column, wound and/or positioned in any other geometrical or spatial configuration.

I claim:

1. Metal detector with multipolar windings comprising at least two pairs of transmitter-receiver multipolar windings, said metal detector having a configuration wherein at least one pair of transmitter-receiver windings has a different number of poles than remaining pairs of windings, thus ensuring that two like metal bodies in simultaneous transit through said metal detector that are placed at a minimum signal pitch d produce a signal sufficient to activate an alarm in at least one of the pairs of the transmitter-receiving windings, wherein said at least two pairs of transmitter-receiver multipolar windings with different number of poles have two different minimum signal pitches d1 and d2 so that an inequality:

$$d1 \times K1 \neq d2 \times K2$$

holds, where K1 and K2 are whole, odd numbers, said configuration ensuring a detection of said metal bodies in simultaneous transit through said metal detector irrespective of a distance between said metal bodies.

2. Metal detector as claimed in claim 1, wherein said at least two pairs of transmitter-receiver multipolar windings are overlapped.

3. Metal detector as claimed in claim 1, wherein said at least two pairs of transmitter-receiver multipolar windings are placed adjacently to one another.

4. Metal detector as claimed in claim 1, wherein said at least two pairs of transmitter-receiver windings are positioned on support panels.

5. Metal detector as claimed in claim 1, wherein said at least two pairs of multipolar windings are positioned on columns.

6. Metal detector with multipolar windings comprising at least two pairs of transmitter-receiving multipolar windings having a different number of poles among them and minimum signal pitches d1 and d2 such that an inequality:

$$d1 \times K1 \neq d2 \times K2$$

holds, where K1 and K2 are whole, odd numbers, said metal detector having configuration wherein all of said at least two pairs of transmitter-receiver multipolar windings have a same height as a height of a controlled passage and at least one of said at least two pairs of transmitter-receiver multipolar windings has a geometrical size different from at least one remaining pair of transmitter-receiver multipolar windings.

7. Metal detector as claimed in claim 6, wherein said at least two pairs of transmitter-receiver multipolar windings are positioned on support panels.

8. Metal detector as claimed in claim 6, wherein said at least two pairs of transmitter-receiver multipolar windings are positioned on columns.

* * * * *